(12) United States Patent
Sethuraman et al.

(10) Patent No.: US 11,063,724 B1
(45) Date of Patent: Jul. 13, 2021

(54) REDUCED CHANNEL-SOUNDING IN MU-MIMO WLANS

(71) Applicant: Cypress Semiconductor Corporation, San Jose, CA (US)

(72) Inventors: Prasanna Kumar Sethuraman, Bangalore (IN); Sridhan Sreepadha, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/741,984

(22) Filed: Jan. 14, 2020

(51) Int. Cl.
  *H04L 5/00* (2006.01)
  *H04B 7/0452* (2017.01)
  *H04B 7/06* (2006.01)
  *H04L 25/02* (2006.01)
  *H04B 7/0417* (2017.01)
  *H04L 27/26* (2006.01)

(52) U.S. Cl.
  CPC ......... *H04L 5/0048* (2013.01); *H04B 7/0417* (2013.01); *H04B 7/0452* (2013.01); *H04B 7/0606* (2013.01); *H04B 7/066* (2013.01); *H04L 25/0204* (2013.01); *H04L 25/0226* (2013.01); *H04L 27/2628* (2013.01)

(58) Field of Classification Search
  CPC ............... H04L 5/0048; H04L 25/0204; H04L 25/0226; H04L 27/2628; H04B 7/0417; H04B 7/0452; H04B 7/0606; H04B 7/066
  See application file for complete search history.

(56) References Cited

U.S. PATENT DOCUMENTS

| | | | |
|---|---|---|---|
| 9,172,446 B2* | 10/2015 | Harel | H04W 88/08 |
| 9,887,749 B2* | 2/2018 | Suh | H04B 7/0617 |
| 9,942,884 B2 | 4/2018 | Lee et al. | |
| 10,057,846 B2 | 8/2018 | Mohamed et al. | |
| 10,154,476 B2 | 12/2018 | Yang et al. | |
| 10,250,309 B2 | 4/2019 | Truong et al. | |
| 10,348,460 B2 | 7/2019 | Lim et al. | |
| 2006/0198294 A1* | 9/2006 | Gerlach | H04L 5/0048 370/208 |
| 2010/0260248 A1* | 10/2010 | Hung | H04B 17/364 375/224 |

(Continued)

FOREIGN PATENT DOCUMENTS

| | | |
|---|---|---|
| WO | 2014092034 A1 | 6/2014 |
| WO | 2014171551 A1 | 10/2014 |

OTHER PUBLICATIONS

Chisaguano, Diego, "Channel Estimation and Detection Schemes for ESPAR Antenna-Based OFDM Receivers," Department of Information Science, Nara Institute of Science and Technology, Mar. 3, 2016; 129 pages.

*Primary Examiner* — Jaison Joseph

(57) ABSTRACT

A method for reducing channel sounding overhead in a MU-MIMO WLAN system, and apparatus for performing the method are disclosed. The method includes transmitting a sparse set of pilot symbols in a pseudorandom distribution across a plurality of subcarriers, from a plurality of antennas to one or more client devices on a plurality of spatial streams; receiving a sparse set of channel estimates in the frequency and spatial domains, from the one or more client devices as beamforming feedback based on the sparse set of pilot symbols; and recovering the channel in a compressed sensing framework.

20 Claims, 12 Drawing Sheets

(56) References Cited

U.S. PATENT DOCUMENTS

| | | |
|---|---|---|
| 2013/0070624 A1 | 3/2013 | Nguyen et al. |
| 2014/0362732 A1* | 12/2014 | Landstrom ............ H04W 24/02 |
| | | 370/254 |
| 2017/0111924 A1* | 4/2017 | Josiam .................. H04L 5/0057 |
| 2017/0256208 A1 | 9/2017 | Thanikachalam et al. |
| 2017/0279508 A1* | 9/2017 | Truong ................ H04B 7/0626 |
| 2017/0294953 A1 | 10/2017 | Ghosh et al. |
| 2019/0115970 A1* | 4/2019 | Vermani ............. H04B 7/0891 |

* cited by examiner

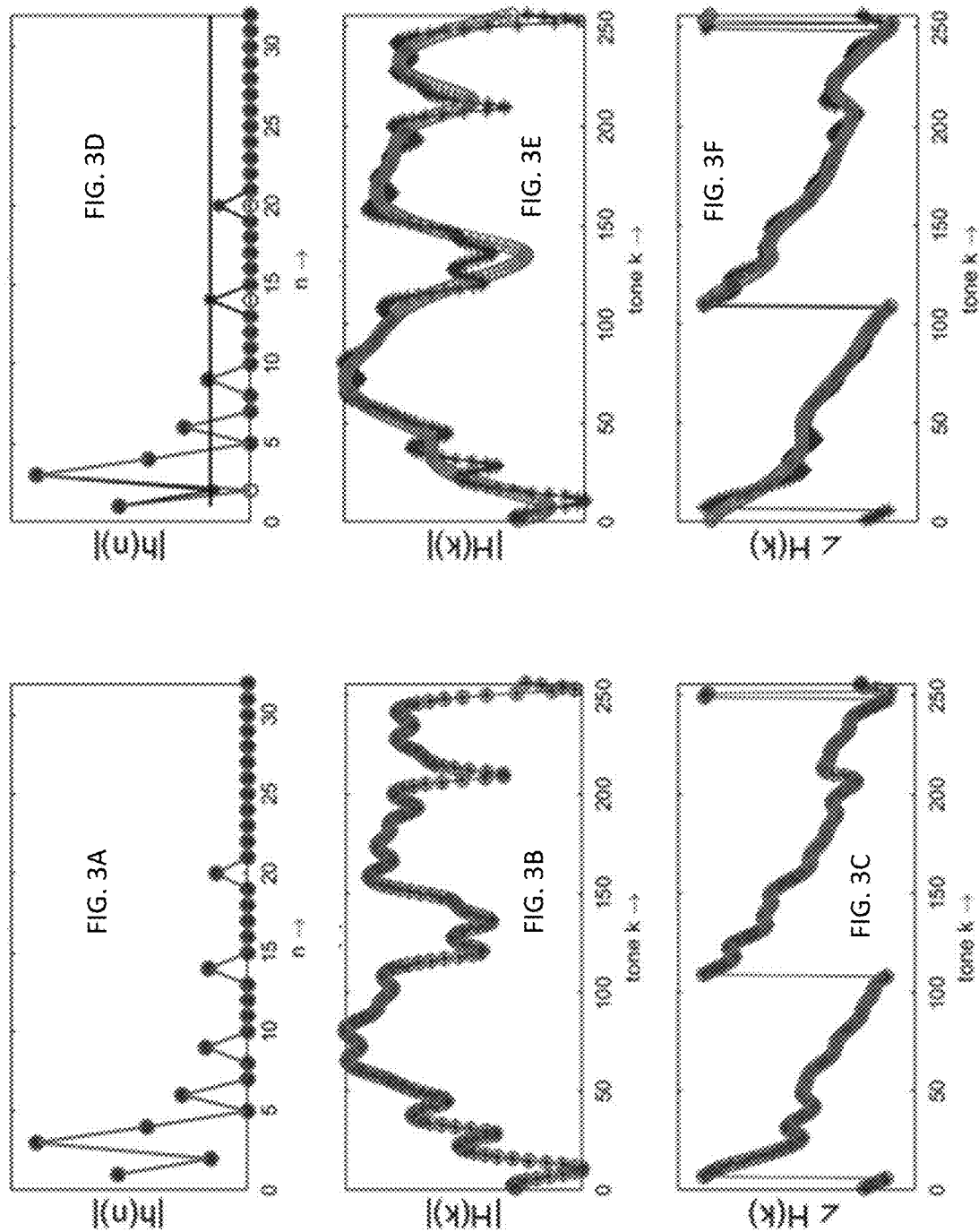

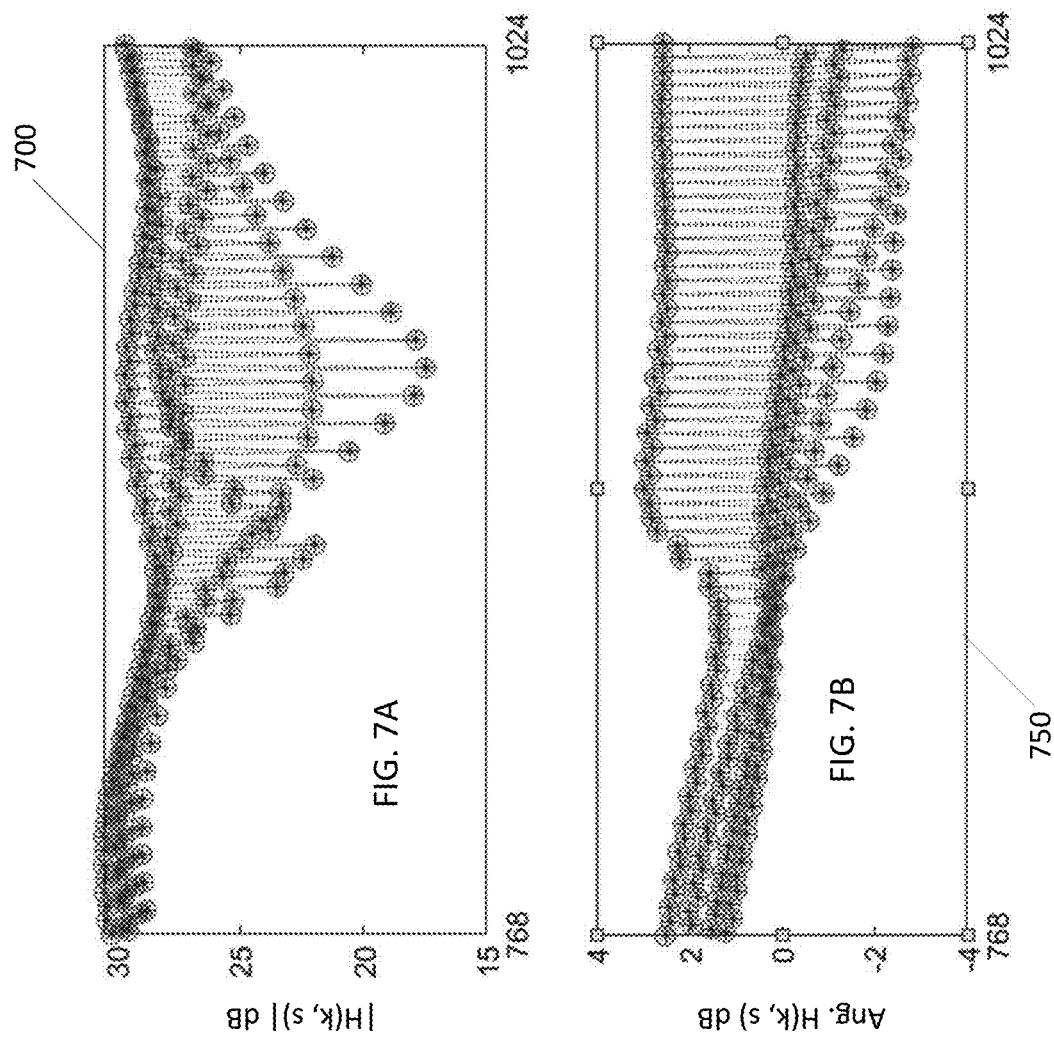

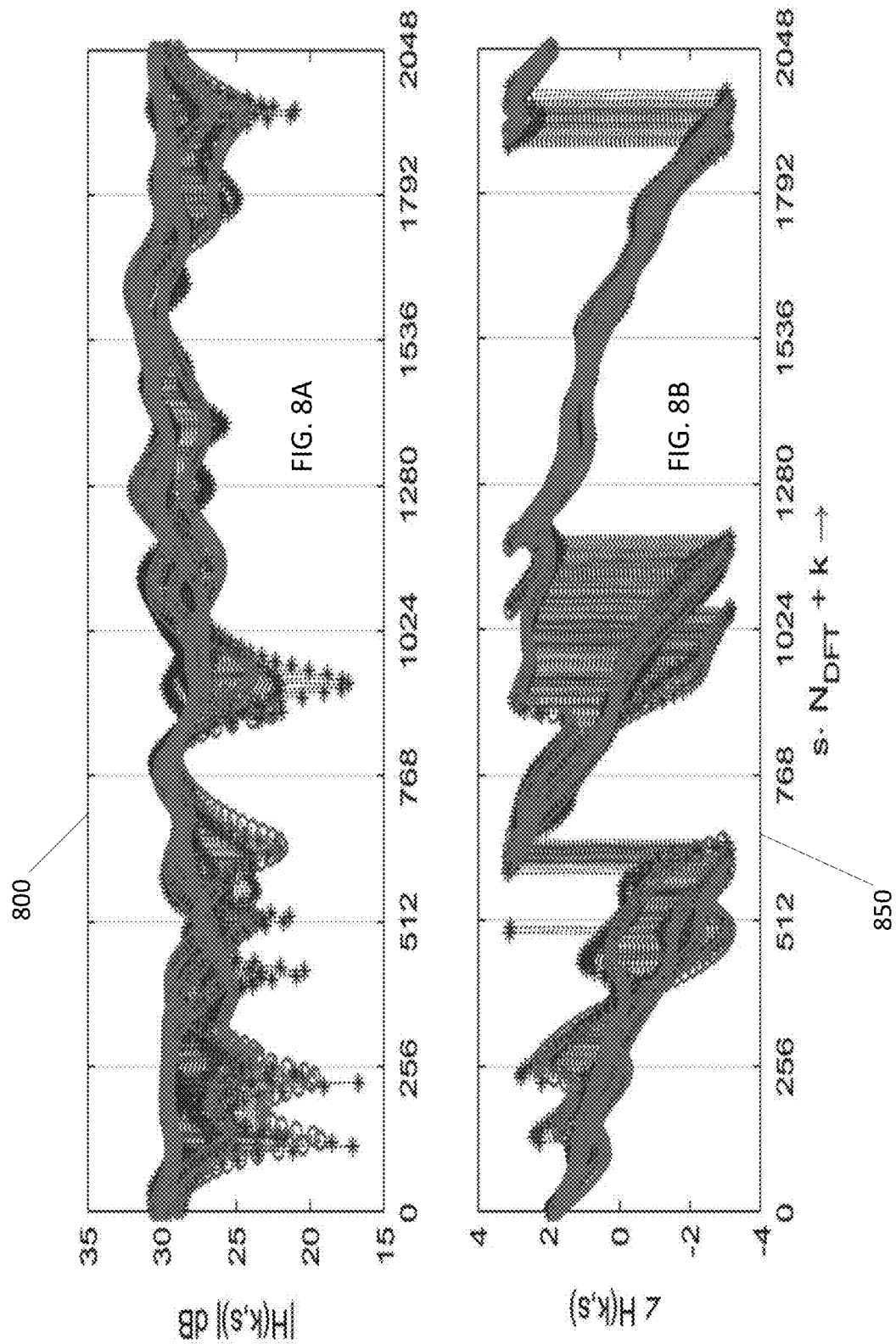

REDUCED CHANNEL-SOUNDING IN MU-MIMO WLANS

FIELD

This disclosure pertains to wireless networks in general, and more particularly to reducing channel-sounding overhead in multi-user multiple-input multiple-output (MU-MIMO) systems.

BACKGROUND

Wireless networks increasingly use multiple-input multiple-output (MIMO) radio channels between an access point and a client device. Multiple transmitting and receiving antennas allow multipath propagation based on beamforming, in which constructive and destructive interference of radio waves is used to enhance simultaneous signal transmission between the access point and various client devices. Because an environment of a wireless network is often dynamic, the access point may have to periodically probe the environment by initiating a channel sounding procedure during which a set of pilot symbols is output by multiple antennas of a network access point and received by multiple antennas of various client devices. The client devices may then communicate back to the access point the channel state information extracted from the received pilot symbols. Equipped with this feedback, the access point may perform optimized beamforming, which is tailored for each client device given the contemporaneous conditions of the wireless network environment. With a large number of client devices, each equipped with multiple antennas, the amount of channel sounding performed by the access point and the amount of channel sounding feedback that has to be provided to the access point by the client devices may become quite significant and take a substantial amount of time. This may leave significantly less time, than would be optimal, for the actual data transmission.

The current IEEE 802.11ac and draft IEEE 802.11ax standards, as part of a channel sounding process, specify the transmission of a null data packet (NDP) containing long training fields (LTFs), which are symbols known to the AP and the client device(s) that can be used to characterized the spatial channels between the AP and the client devices. The NDP includes m LTFs, where m is the number of transmit antennas in the AP. The symbols in each LTF are a unique pattern of bits distributed across all of the OFDM (orthogonal frequency division multiplex) subcarriers (tones) used by the AP (up to 512 tones in IEEE 802.11ac, for example). Each antenna in each client device receives the m LTFs. So, if there are n total receiving antennas in the client devices, and there are $N_t$ tones (each with b bits) in each LTF, then the total number of training bits is equal to $m*n*b*N_t$. The number of training bits increases linearly as the number of transmit and receive antennas, and the number of subcarriers increases, which does not scale well for anticipated massive MU-MIMO networks.

SUMMARY

Aspects of the present disclosure are directed to optimizing the process of channel sounding by a wireless access point to reduce channel sounding overhead, and channel feedback processing in the wireless access point and in the clients of the wireless access point (AP).

In one example, a method in an access point (AP) in a multi-user, multiple-input multiple-output (MU-MIMO) wireless LAN includes transmitting a sparse set of pilot symbols in a pseudorandom distribution across a plurality of subcarriers, from a plurality of antennas to one or more client devices on a plurality of spatial streams; receiving a sparse set of channel estimates in the frequency and spatial domains, from the one or more client devices as beamforming feedback based on the sparse set of pilot symbols; and recovering the channel in a compressed sensing framework.

In one example, the sparse set of channel estimates includes a complex frequency domain matrix for each of the plurality of spatial streams, where recovering the channel in the compressed sensing framework includes: extracting a sparse time domain and spatial frequency domain matrix from the sparse set of channel estimates, with a compressed sensing algorithm; constructing a κ-sparse vector by stacking the channel vectors of the sparse time domain and spatial frequency domain matrix; and reconstructing the channel in the frequency and spatial domains from the κ-sparse vector.

In one example, the method also includes pseudo-randomly distributing 4κ pilot symbols across the plurality of subcarriers for channel sounding.

In one example, transmitting the sparse set of pilot symbols includes, in a first transmission, transmitting a set of pilot symbols with a duration not less than a duration of a cyclic prefix established for a multipath channel; in subsequent transmissions, transmitting the 4κ pseudo-randomly distributed pilot symbols across the plurality of subcarriers; and mapping only one pilot symbol to only one antenna of the plurality of antennas during a symbol period.

In one example, the method also includes transmitting a pilot symbol format announcement in advance of the sparse set of pilot symbols, where the pilot symbol format announcement includes one of a table of pseudo-randomly distributed pilot symbol locations, or a seeding number for a pseudo-random number generator in the one or more client devices, where the pseudo-random number generator replicates a pseudo-random number generator in the AP.

In one example, the method also includes polling each of the one or more client devices sequentially for channel estimates based on the sparse set of pilot symbols.

In one example, constructing the k-sparse vector comprises one of selecting all non-zero elements of the channel vectors, selecting all non-zero elements of the channel vectors that are greater than or equal to a non-zero threshold, and selecting all non-zero elements of the channel vectors that are greater than or equal to a non-zero threshold, and a limited number of elements that are below the non-zero threshold.

In one example, a method in a client device in a multi-user, multiple-input multiple-output (MU-MIMO) wireless LAN includes receiving at one or more antennas, a sparse set of pilot symbols from a plurality of antennas of the AP according to a predetermined distribution of pilot symbols across a plurality of subcarriers, generating and transmitting a sparse set of channel estimates to the AP based on the sparse set of pilot symbols, in response to a polling request from the AP, and receiving another sparse set of pilot symbols from the AP based on the sparse set of channel estimates after an expiration of a channel coherence period.

In one example, an access point (AP) in a multi-user, multiple-input multiple-output (MU-MIMO) wireless LAN includes a processor, a memory coupled with the processor, and a radio coupled with the processor including a plurality of transceivers and a plurality of associated antennas, where the memory includes instructions that, when executed by the processor, configure the AP to transmit a sparse set of pilot symbols in a pseudorandom distribution across a plurality of subcarriers, from the plurality of antennas to one or more client devices on a plurality of spatial streams; receive a sparse set of channel estimates in the frequency and spatial domains, from the one or more client devices as beamforming feedback based on the sparse set of pilot symbols; and recover the channel in a compressed sensing framework.

In one example, where the sparse set of channel estimates comprise a complex frequency domain matrix for each of the plurality of spatial streams, where to recover the channel in the compressed sensing framework, the processor is further configured to extract a sparse time domain and spatial frequency domain matrix from the sparse set of channel estimates, with a compressed sensing algorithm, construct a κ-sparse vector by stacking the channel vectors of the sparse time domain and spatial frequency domain matrix, and reconstruct the channel in the frequency and spatial domains from the κ-sparse vector.

In one example, to transmit the sparse set of pilot symbols, the processor is further configured to pseudo-randomly distribute 4κ pilot symbols across the plurality of subcarriers for channel sounding.

In one example, to transmit the sparse set of pilot symbols, the AP is configured, in a first transmission, to transmit a set of pilot symbols with a duration not less than a duration of a cyclic prefix established for a multipath channel; and in subsequent transmissions, to transmit the 4κ pseudo-randomly distributed pilot symbols across the plurality of subcarriers and to map only one pilot signal to only one antenna of the plurality of antennas during each symbol period.

In one example, the AP is configured to transmit a pilot symbol format announcement in advance of the sparse set of pilot symbols, where the pilot signal format announcement includes one of a table of pseudo-randomly distributed pilot symbol locations, or a seeding number for a pseudo-random number generator in the one or more client devices, wherein the pseudo-random number generator replicates a pseudo-random number generator in the AP.

In one example, to construct the κ-sparse vector, the processor is configured to select one of all non-zero elements of the channel vectors, all non-zero elements of the channel vectors that are greater than or equal to a non-zero threshold, or all non-zero elements of the channel vectors that are greater than or equal to a non-zero threshold, and a limited number of elements that are below the nob-zero threshold.

In one example, a non-transitory computer-readable medium includes instructions that, when executed by a processor in a wire LAN access point, cause the access point to perform operations including all of the foregoing methods.

BRIEF DESCRIPTION OF THE DRAWINGS

FIG. 3A is a graph illustrating an example of a sparse CIR according to the present disclosure;

FIG. 3B is a graph illustrating an example of channel amplitude recovery based on the sparse CIR of FIG. 3A;

FIG. 3C is a graph illustrating an example of channel phase recovery based on the sparse CIR of FIG. 3A;

FIG. 3D is a graph illustrating an example of a sparse CIR with thresholding according to the present disclosure;

FIG. 3E is a graph illustrating an example of channel amplitude recovery based on the sparse CIR of FIG. 3D;

FIG. 3F is a graph illustrating an example of channel phase recovery based on the sparse CIR of FIG. 3D;

FIG. 7A illustrates an expanded segment of FIG. 6A;

FIG. 7B illustrates an expanded segment of FIG. 6B;

FIG. 8A is a graph illustrating an example of channel amplitude recovery with thresholding according to the present disclosure;

FIG. 8B is a graph illustrating an example of channel phase recovery with thresholding according to the present disclosure;

DETAILED DESCRIPTION

Aspects of the present disclosure are directed to optimizing the process of channel sounding by a wireless access point to reduce channel sounding overhead, and channel feedback processing in the wireless access point and in the clients of the wireless access point (AP).

Modern wireless network environments often provide wireless connectivity to a large number of client devices (also referred to as clients, users, user equipment and stations) using wireless local area networks (WLANs). A wireless network may be located in a public place (a store, an airport, a passenger plane or bus) or in a private place (a home, an automotive environment, such as a passenger car, a sport-utility vehicle, and the like). Client devices may include laptops, tablets, smart phones, and the like with significant computing power, or devices associated with the IoT (Internet of Things) that have limiter processing resources. The wireless networks may include devices equipped with multiple antennas and capable of using MIMO (multiple-input, multiple output) channels for data transmission.

In a crowded environment of a typical wireless network, a line-of-sight radio transmission is rarely available as radio waves experience reflection from various obstacles (such as users, walls, furniture, moving vehicles, and so on) resulting in rather complicated interference/reflection/diffraction patterns of the radio waves.

Figure 1:
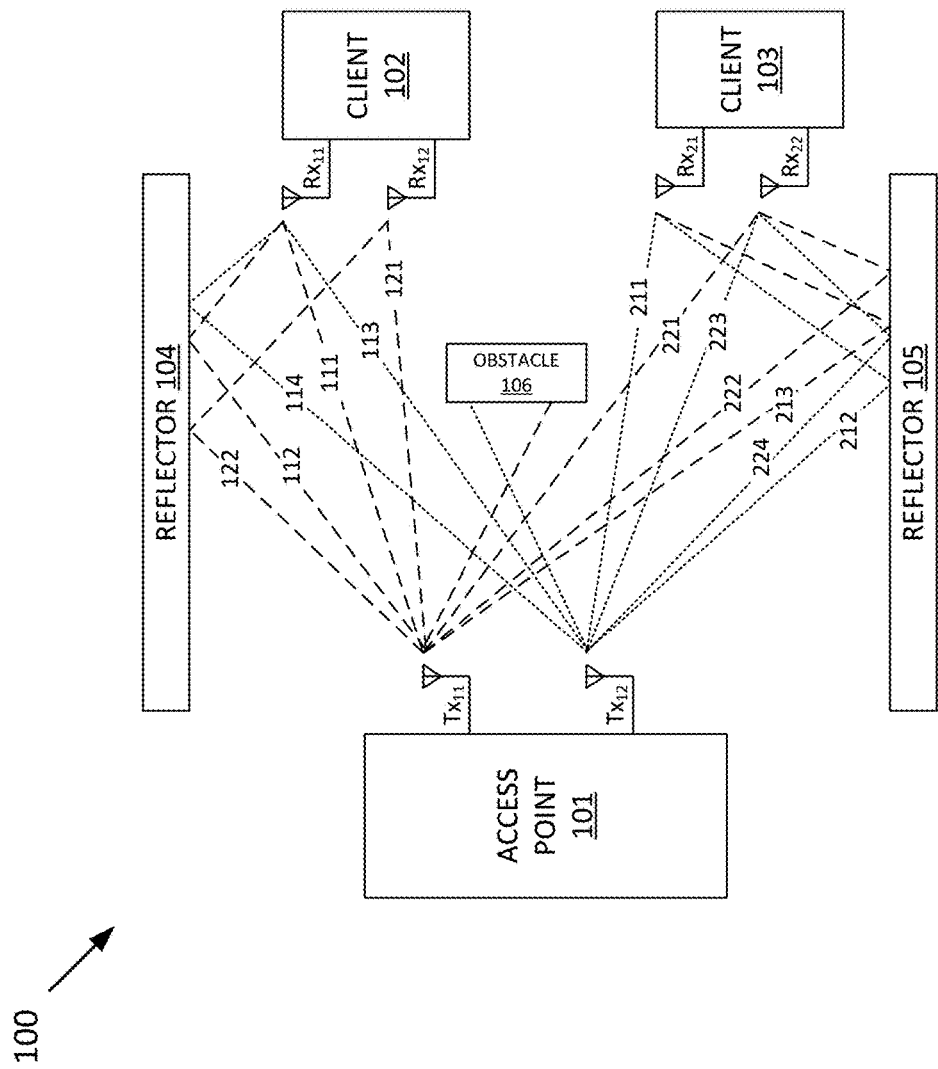
FIG. 1 is a block diagram illustrating an example system according to the present disclosure.

FIG. 1 illustrates a simplified example WLAN system 100. System 100 includes an access point (AP) 101 with two antennas $Tx_{11}$ and $Tx_{12}$. System 100 also includes a client 102 with two antennas $Rx_{11}$ and $Rx_{12}$, and a client 103 with two antennas $Rx_{21}$ and $Rx_{22}$. System 100 also includes reflecting objects (reflectors) 104 and 105 that create multipath signals between AP 101 and clients 102 and 103, and an obstacle 106 that blocks some line-of-sight (LOS) paths between AP 101 and clients 102 and 103. As illustrated in FIG. 1, even this simple example system has multiple signal paths between the AP 101 and clients 102 and 103. For example, antenna $Rx_{11}$ receives a LOS signal 111 from antenna $Tx_{11}$, a multipath signal 112 from antenna $Tx_{11}$, a LOS signal 113 from antenna $Tx_{12}$, and a multipath signal 114 from antenna $Tx_{12}$. Antenna $Rx_{12}$ receives a LOS signal 121 from antenna $Tx_{11}$ and a multipath signal 122 from antenna $Tx_{11}$. Antenna $Rx_{21}$ receives a LOS signal 211 and a multipath signal 212 from antenna $Tx_{12}$, and a multipath signal 213 from antenna $Tx_{11}$. Antenna $Rx_{22}$ receives a LOS signal 221 and a multipath signal 222 from antenna $Tx_{11}$, and a LOS signal 223 a multipath signal 224 from antenna $Tx_{12}$. These signals may combine constructively or destructively, depending on the amplitude and phase characteristics of the individual paths (channels, streams).

This complexity may be turned to an advantage with beamforming. Using beamforming, the AP 101 may tailor signal output (e.g., amplitude and phase) by its various antennas in order to achieve selective directional enhancement of transmission of data packets towards a particular target client while similarly enhancing radio transmission of other data packets intended for other clients. This may allow efficient simultaneous transmission of information to multiple clients.

Because the wireless environment may be constantly changing, the AP may need to perform periodic channel sounding by sending predetermined pilot symbols to the clients. Each client may return channel state information (CSI) to the AP that estimates the state of each spatial channel between antennas of the AP and antennas of the client devices across the bandwidth of the communication channel. For the orthogonal frequency-division multiplexing (OFDM) schemes used in modern wireless systems such as WiFi® and LTE, the CSI may need to be sent for multiple frequency subcarriers (also referred to as "tones") in the radio band used for the wireless communication. The number of such tones may depend on the specific protocols employed. For example, in the IEEE 802.11ac VHT (Very High Throughput) standard, a 20 MHz channel may have 52 tones, a 40 MHz channel may have 108 tones, an 80 MHz channel may have 234 tones, a 160 MHz channel may have 468 tones. In the IEEE 802.11ax HEW (High-Efficiency Wireless) standard, the number of tones (and the resulting amount of CSI to be sent to the AP) is even greater: 208 tones for a 20 MHz channel, 432 for a 40 MHz channel, 936 for an 80 MHz channel, 1872 for a 160 MHz channel. In the case of 8 AP antennas and 2 client antennas (16 spatial streams), operating in an 80 MHz 802.11ax channel and requiring 4 bits to transmit CSI feedback data per tone and per spatial stream, there are 16×936×4=59904 feedback bits to be transmitted to the AP during one channel sounding session. At a rate of transmission of 24 Mbps, it may take 2.5 ms to send this amount of feedback. If the channel sounding is repeated every 25 ms, for example, about 10% of the total air time may be spent on feedback transmission.

The implementations described herein overcome the challenges and problems set forth above. More specifically, the implementations disclosed herein reduce the number of pilot symbols required to fully characterize the channel for all spatial streams and subcarriers (tones) between the AP and its clients. In one example, as described in greater detail below, the reduction is achieved by the AP transmitting a sparse set of predetermined pilot symbols. Initially, the sparse set of pilot symbols may be referred to as a minimally sparse set of pilot symbols, which is a lower bound on the number of pilot symbols set by the length of the cyclic prefix (CP), which is the prefixing of a symbol with a repetition of the end of the symbol. The CP provides a guard interval (GI) to prevent intersymbol interference, and also facilitates circular convolution for the application of DFTs (discrete Fourier transforms). To be effective, the CP must have a length (duration) at least as long as the multipath channel, which is also the lower bound on the duration (number) of pilot symbols in an initial (minimally) sparse set of pilot symbols before the channel is fully characterized.

In a MIMO system according to the present disclosure, with m transmit antennas and n receive antennas, the only computation required in the client devices is the determination of a sparse channel matrix $\underline{H}$, derived from $\underline{Y}=\underline{H}\underline{X}$, where $\underline{H}$ is the m by n sparse channel matrix, $\underline{X}$ is a diagonal m by n matrix containing the predetermined sparse set of pilot symbols, and $\underline{Y}$ is an m by n matrix representing the set of received pilot symbols as distorted by the channel. Each element of the m by n matrix $\underline{H}$ is a complex submatrix $\underline{H}_{ij}$ (1≤i≤m, 1≤j≤n) including an attenuation and a phase delay for each pilot symbol in each of the m by n channels. Each client device can determine its own submatrices of $\underline{H}_{ij}$ for each of its antennas with a straightforward matrix calculation:

$$\underline{H}_{ij}=Y_{ij}(X_{ij})^{-1} \quad (1)$$

Each client device sends its own channel data as frequency domain CSI (channel state information) to the AP in a polling sequence controlled by the AP.

The AP receives the complex (amplitude and phase channel coefficients) CSI feedback in the frequency domain for the initial, minimally sparse set of pilot symbols for each spatial channel. It can be shown that in the time domain, the channel impulse response (CIR) $h_{ij}$ of each spatial stream from the AP to each client antenna is a sparse data set. That is, if the channels are modeled as finite impulse response (FIR) filters, then each filter will have a limited number of non-zero taps, and even fewer non-zero taps above a given noise level. That is, h is sparse. It is known that for such a sparse time domain response, a compressive sampling (or compressive sensing) algorithm, such as the COSAMP algorithm, can be used to extract the sparse time domain channel matrix $\underline{h}$ from only a few elements of $\underline{H}$. COSAMP is an algorithm in a class of algorithms known as "greedy matching pursuit algorithms," which are known in the art. See, for example, D. Needell and J. A. Tropp, *COSAMP: Iterative signal recovery from incomplete and inaccurate samples,* 27 Applied and Computational Harmonic Analysis, No. 3, 301-321 (May 2009). The sparsity of $\underline{h}$ is the number of non-zero taps in the CIR that models the channel (or the number of taps above a non-zero noise threshold—a technique known as de-noising). We denote that sparsity as κ (kappa).

The concept underlying compressive sampling is that for a κ-sparse signal x and the measurement vector y=Φx, the vector $u=\Phi^H y=\Phi^H \Phi x$ has the largest elements at the same locations as the κ non-zero elements in x. The vector u can therefore be used as an initial approximation for x. The algorithm then iteratively computes the residual $r=y-\Phi_{(T)}\hat{x}$ using the T column corresponding to the 2κ largest locations. The residual represents the components that have not yet been approximated. The support set T gets updated in each iteration based on the residual until the energy in the residual is below a certain threshold.

The AP effectively receives a sparse channel matrix in the frequency and spatial domains, where each element of the channel matrix represents the channel characteristics of one spatial stream. The AP stacks the columns of the sparse channel matrix into a sparse vector. Then, using the sparse vector as an input to the compressed sensing framework, the AP generates a κ-sparse vector in the time and spatial frequency domains. The AP then reconstructs the entire channel in the frequency domain for all tones and spatial channels. Then the AP pseudo-randomly selects the placement of 4κ pilot symbols across the subcarriers for transmission from each AP antenna. This process increases the overall throughput of the network, improves connectivity for each of the client devices of the network, and reduces power consumption in both the AP and the client devices.

Figure 2B:
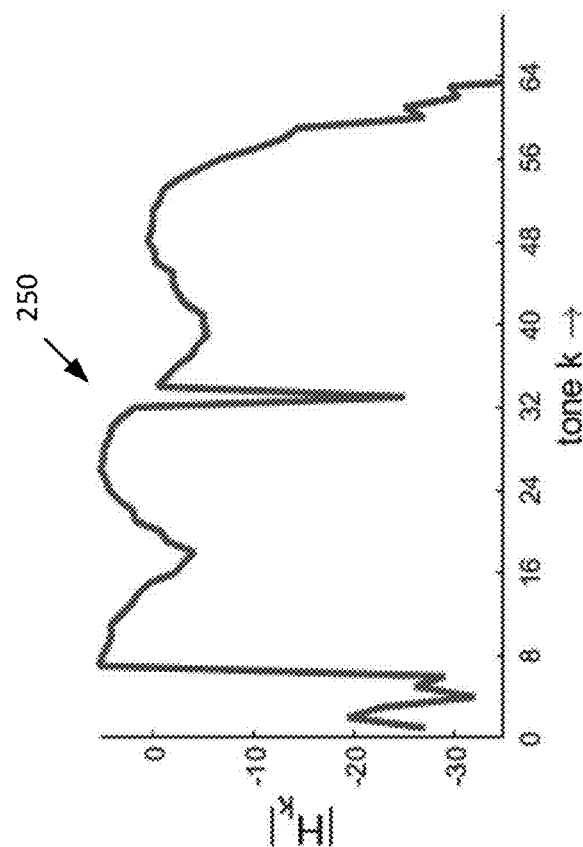
FIG. 2B is a graph illustrating an example frequency domain channel measurement according to the present disclosure.
Figure 2A:
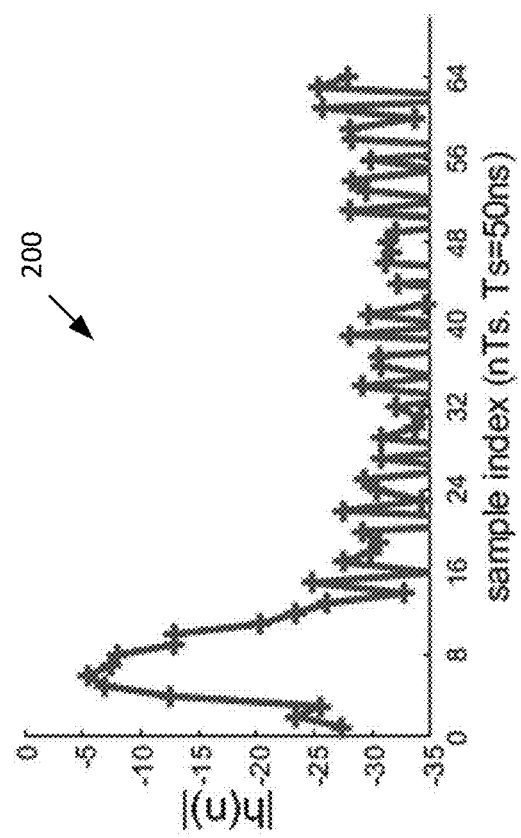
FIG. 2A is a graph illustrating an example channel impulse response (CIR) according to the present disclosure.

FIG. 2A illustrates an example of a CIR 200 for one spatial channel in the time domain between an AP, such as AP 101, and a client device, such as client device 102 or 104, modeled as a 64 tap filter. It can be seen that the time domain channel h(n) only has a limited number of significant non-zero taps, making h a sparse vector. The measurement matrix can then be chosen as the Fourier matrix F, resulting in the frequency domain channel measurement H=Fh, illustrated in FIG. 2B as the plot 250 of H(k), where k is the tone index, corresponding to a 64-point DFT (i.e., $N_{DFT}$=64). Compressed sensing theory can then be applied to measure only a few elements of H to recover h using COSAMP. Denoting the sparsity of h by κ, a sensing (or sampling or selection) matrix S can be constructed that is a $2\kappa \times N_{DFT}$ matrix, with rows that are unit vectors (i.e., the matrix has entries that are either 1 or 0) to pick rows of F. The 2κ×1 measured channel vector is then H2κ=SFh.

FIGS. 3A-3C illustrate an example of the recovery that can be achieved with CoSaMP using just 32 random elements of the frequency domain channel vector H (corresponding to the 32-tap CIR of FIG. 3A), instead of the full 256. FIGS. 3C-3F illustrate the recovery if the elements of h that are below a selected threshold are zeroed out, which in this example, reduces the number of points to 24. FIGS. 3E and 3F illustrate the imperfect, but high quality reproduction of the magnitude of H and the phase of H using only 24 random elements of the frequency domain channel vector H.

This single-channel model can be extended to a MIMO environment by stacking the channel impulse responses for every spatial channel (i.e., every TX-RX path) into a single κ-sparse vector. Denoting the $N_{DFT} \times 1$ time domain channel vector between transmit antenna i and receive antenna j to be $h_{ij}$, this will generate the $m*n*N_{DFT} \times 1$ stacked channel vector $\hat{h}=[(h_{11})^T (h_{21})^T \ldots (h_{m1})^T \ldots (h_{mn})^T]$, where T represents the transpose operation. With $N=m*n*N_{DFT}$, an N×N Fourier matrix $F_N$ can be used to compute the frequency domain measurement vector $H_{1D}=F_N \hat{h}$, but if $h_{ij}$ is κ-sparse, then the sparsity of $\hat{h}$ is m*n*κ. The number of measurements required therefore scales linearly with the number of spatial dimensions $N_s$=m*n. Going forward, the $N_{DFT} \times N_s$ time domain channel matrix is $[h(n, s)]=[h_{11} h_{21} \ldots h_{ij} \ldots h_{mn}]$ where the columns $h_{ij}$ are the channel impulse responses for each TX-RX path.

Figure 4A:
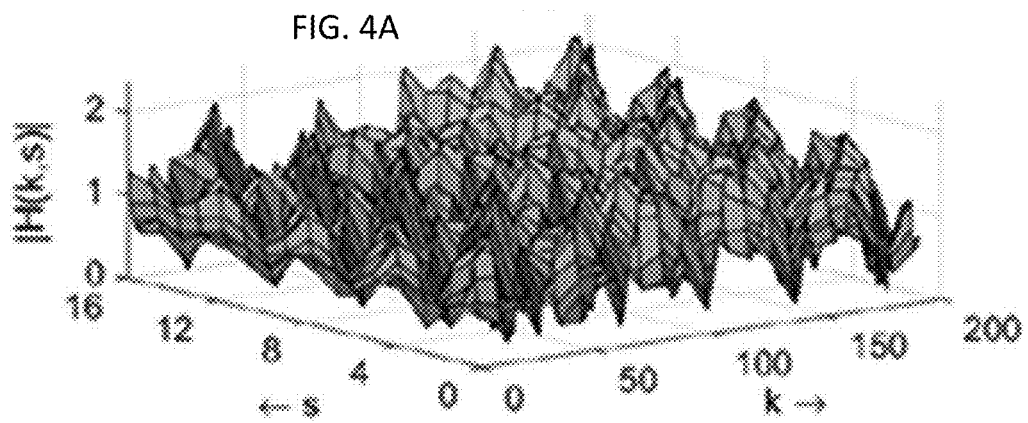
FIG. 4A is a graph illustrating an example of channel response in the frequency and spatial domains according to the present disclosure.
Figure 4B:
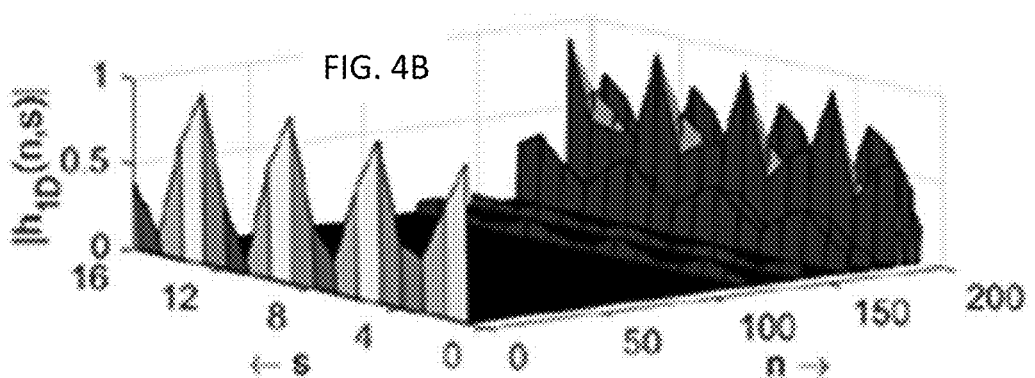
FIG. 4B is a graph illustrating an example of applying a one-dimensional (1-D) inverse Fourier transform to the channel response of FIG. 4A.
Figure 4C:
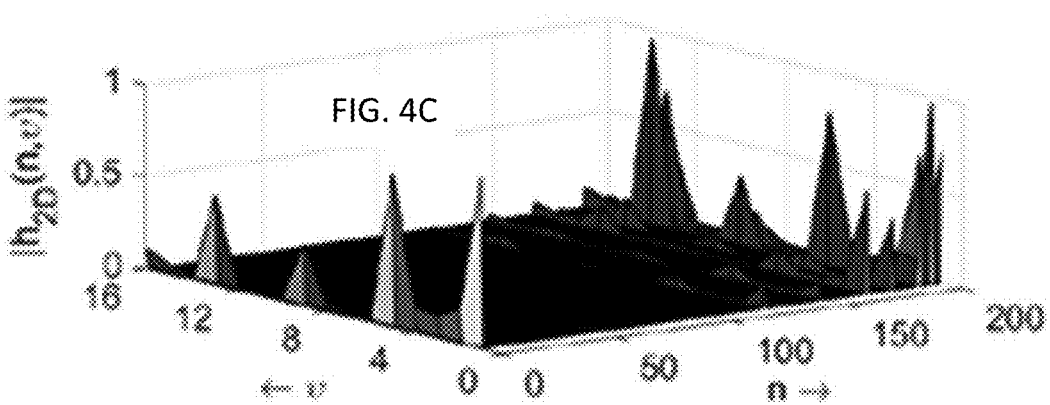
FIG. 4C is a graph illustrating an example of applying a two-dimensional inverse Fourier transform to the channel response of FIG. 4A.

Referring now to FIGS. 4A-4C, the dense frequency domain channel [H(k, s)] shown in FIG. 4A transforms to $[h(n, s)]=F_{N_{DFT}}^H [H(k, s)]$ shown in FIG. 4B, and it can be seen that there are still a significant number of non-zero elements in [h(n, s)]. This is because the compression is achieved across tones, but there is no compression across the spatial dimension. For a large number of antennas, the correlation between antennas is low if they are separated by more than λ/2, where λ is the wavelength at the subcarrier frequencies. For example, at a center frequency fc=2.4 GHz, λ=12.5 cm (~5 inches), so spacing multiple antennas (e.g., 8 antennas) this way in a reasonably sized AP is virtually impossible, so the antennas will be correlated in the spatial dimension. This correlation can be exploited to achieve compression in the spatial dimension as well as the frequency dimension.

Eq. (1) is the one-dimensional (1D) inverse Fourier Transform in frequency, plotted in FIG. 4B.

$$[h(n,s)]=F_{N_{DFT}}^H[H(k,s)] \quad (1)$$

Eq. (2) is the two-dimensional (2D) inverse Fourier Transform in frequency and space, plotted in FIG. 4C.

$$[h(n,v)]=F_{N_{DFT}}^H[H(k,s)]F_{N_s}^H \quad (2)$$

As can be seen in FIG. 3C, the spatial correlation of the antennas increases the sparsity. The columns of the matrix [h(n, v)] can be stacked and transformed back to the frequency domain as in Eq. (3):

$$[H(k,s)]=F_{N_{DFT}}[h(n,v)]F_{N_s} \quad (3)$$

Denoting the stacked vector [h(n, v)] as $\hat{h}$, Eq. (3) can be rewritten to get Eq. (4):

$$\hat{H}=(F_{N_{DFT}} \otimes F_{N_s})\hat{h} \quad (4)$$

Where ⊗ is the Kronecker product of the matrices $F_{N_{DFT}}$ and $F_{N_s}$. Eq. (3) provides the formulation needed to apply Compressed Sensing, with $\hat{h}$ being the k-sparse vector, $(F_{N_{DFT}} \otimes F_{N_s})$ being the $N_{DFT}N_s \times N_{DFT}N_s$ measurement matrix, and $\hat{H}$ is the measured signal vector. Only 2 k measurements of $\hat{H}$ are needed to recover $\hat{h}$. It should be noted that there are other basis vectors apart from the Fourier basis in $F_{N_s}$ that can achieve better compression along the spatial domain, such as the eigenvectors for the spatial covariance matrix.

Figure 5A:
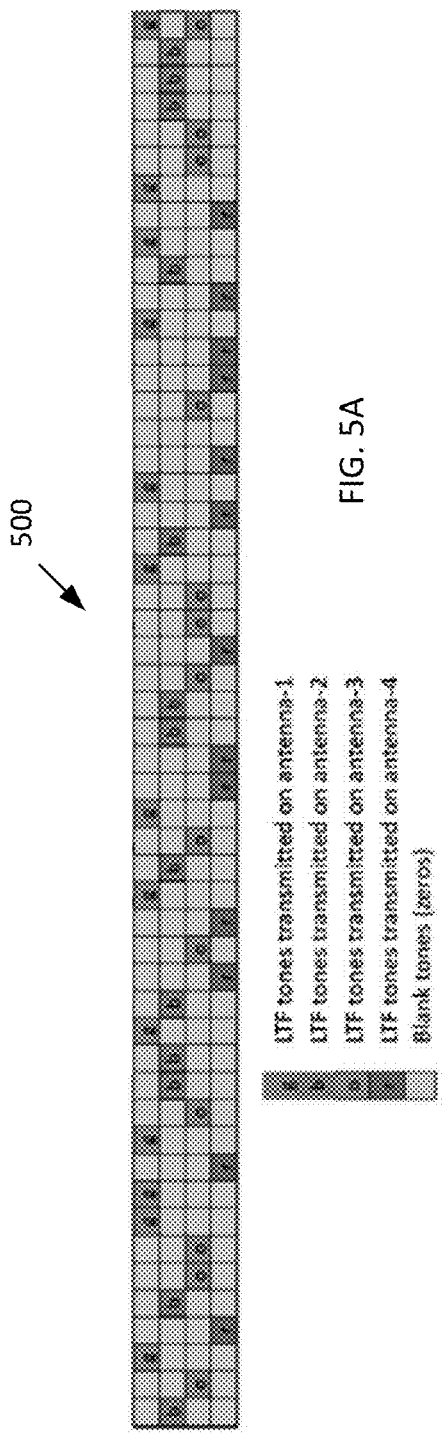
FIG. 5A is an example of a pilot symbol transmission pattern according to the present disclosure.
Figure 5B:
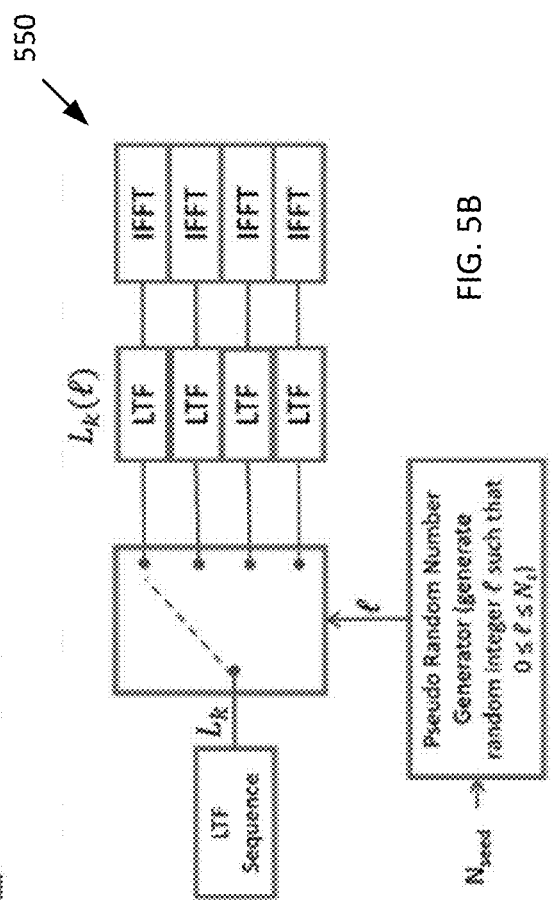
FIG. 5B is a block diagram illustrating an example pseudo-random sequencer according to the present disclosure.

Since only 2 k measurements of the channel [H(k, s)] are needed, it is possible to puncture the LTFs at the transmitter of the AP and only transmit for a limited number of random tones, but no fewer than the number of pilots required to fill at least one whole OFDM symbol, which is necessary to perform an FFT. Rather than the standard P matrix, which transmits a given tone simultaneously from all m transmit antennas, the LTF symbol $L_k$ for a given tone k can be transmitted from only one of the m transmit antennas, with the other antennas transmitting zeros. FIG. 5a illustrates an example transmission pattern 500 for 52 tones and m=4 transmit antennas, with 13 LTF tones transmitted per antenna. The LTF tone locations for each antenna are non-overlapping with the LTF tone locations for the other antennas. The random LTF locations for each antenna can be selected by using a pseudo random sequencer 550 as illustrated in FIG. 5B, based on a linear feedback shift register (LFSR) for example, to map the LTF sequence $L_k$ to the m transmit antennas as shown in FIG. 5B. The seed for the LFSR can be communicated by the AP to the client devices as part of an association handshake process or in the NDPA. Another advantage of removing the P matrix is that the LTF on any given antenna can be transmitted with higher power since all of the available transmitter power is allocated to one antenna at a time and not divided across the $N_t$ antennas as it would have been for LTF transmission with the standardized P matrix. This will also result in better SNR (signal to noise ratio) for channel estimation at the receivers of the client devices.

At the client devices, the LTF locations can be calculated based on the LFSR seed, using the same LFSR configuration that is used by the AP. The client devices estimate the channel $H_k(i, j)$ on those locations, as described above, and send them back in the form of sparse CSI feedback. If the number of measurements $N_K$ required is less than $N_{DFT}$, then only one LTF symbol will be used for all $N_t$ antennas. If $N_K>NDFT$, we need $\lceil N_K/N_{DFT} \rceil$ LTF symbols. Note that the l1 minimization used in the compressive sensing framework requires at least 2κ measurements to recover a κ-sparse real vector, but a complex vector like the channel vector requires $N_K \geq 4\kappa$. The number of feedback bits can be reduced if only the locations of the κ non-zero complex time-domain channel taps are sent by the client devices, but that would require significant processing power at the clients to estimate the time domain channel by computing m*n DFTs, and access to the channel matrix for all of the tones. Instead, the method described here allows the number of transmitted LTFs to be reduced while at the same time avoiding computationally intensive processing at the client devices. Usually, the AP is plugged into a wall socket and the client devices are battery operated, so it is beneficial to reduce computations performed by the client devices to reduce power consumption. The AP can then run an l1 minimization algorithm such as CoSaMP on the received feedback to recover the full channel vector, which can then be used to compute a precoder (e.g., an SVD precoder) to compensate for the transmission channel by pre-distorting data transmissions.

Figure 6A:
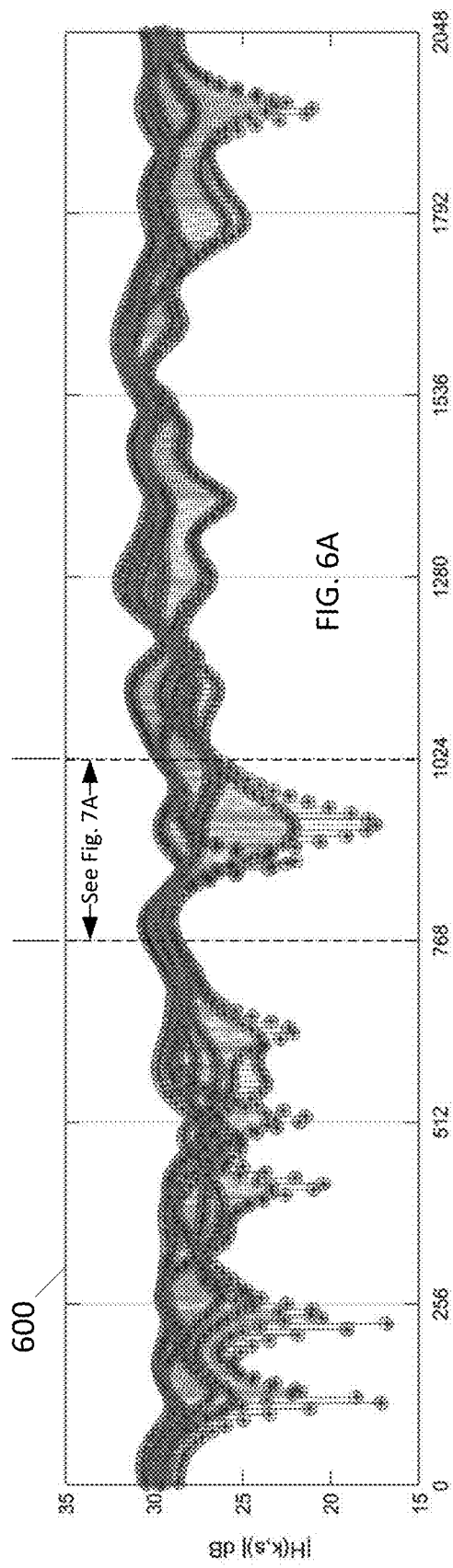
FIG. 6A is a graph illustrating an example of channel amplitude recovery according to the present disclosure.
Figure 6B:
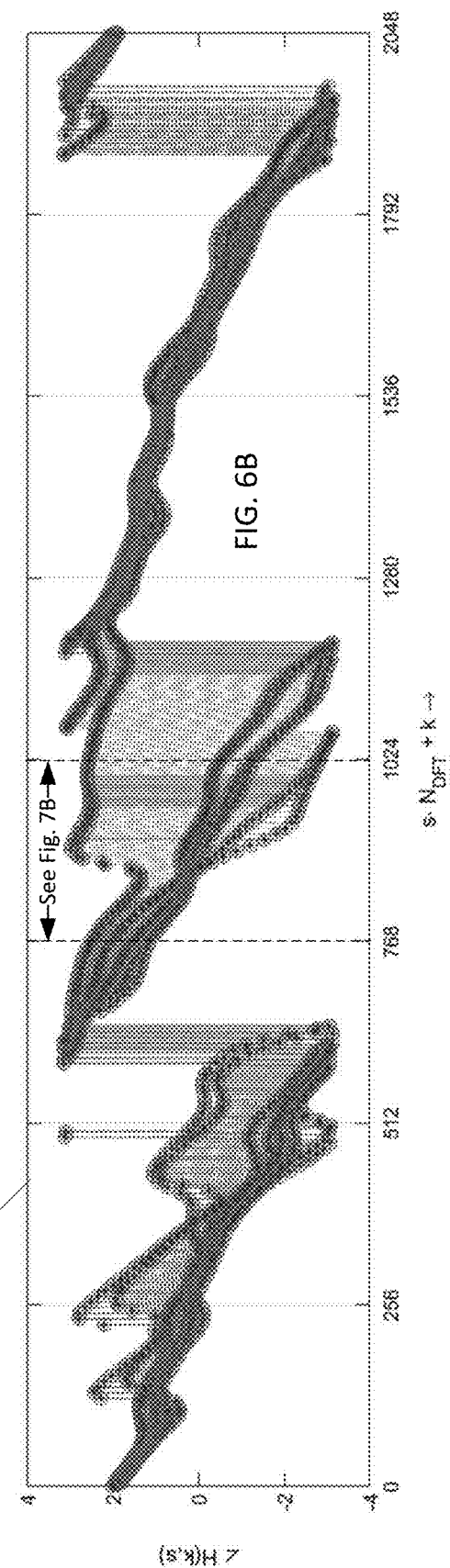
FIG. 6B is a graph illustrating an example of channel phase recovery according to the present disclosure.

FIGS. 6A and 6B are graphs 600 and 650, respectively, illustrating an example of channel recovery (for amplitude and phase, respectively) using Eq. (4) above. Here, $N_{DFT}=256$, m=4, n=2 and the channel vector $\hat{h}$ in Eq. (4) has sparsity κ≤50, so the number of measurements needed is $N_K=4\kappa=200$. The plus signs are the original channel vector and the circles are the recovered channel vector from NK measurements. FIGS. 7A and 7B are expanded sections 700 and 750 of FIGS. 6A and 6B, respectively.

Figure 9:
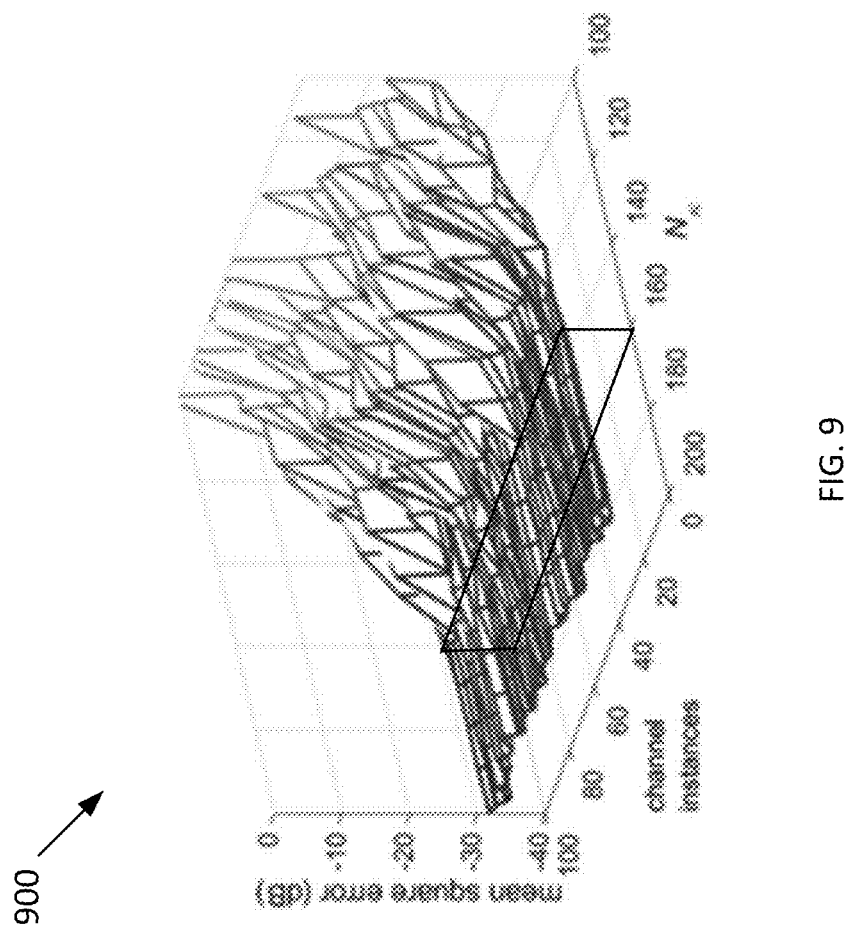
FIG. 9 is a graph of mean square error in channel recovery as a function of threshold level according to the present disclosure.

The sparsity can be further reduced by ignoring all channel taps in $\hat{h}$ that are more than 30 dB below the peak, reducing the number of measurements to $N_K=160$ in this example, since the sparsity reduces to κ<35. There is a resulting error in the recovered channel as seen in graphs 800 and 850 of, respectively, FIGS. 8A and 8B, but as long as the mean square error is acceptable, this method provides a way to trade-off the feedback accuracy with the number of feedback bits. FIG. 9 is a graph 900 illustrating the mean squared error between the original and reconstructed channel vector for κ=35, for different channel vectors and $N_K$. In the example of FIG. 9, it can be seen that there is no significant reduction in mean square error for $N_K>160$ at a −30 dB threshold. It should be noted that ignoring the channel taps below a threshold is beneficial when the receiver is operating in a low received signal strength region where the smaller taps are dominated by noise due to low SNR.

Figure 10:
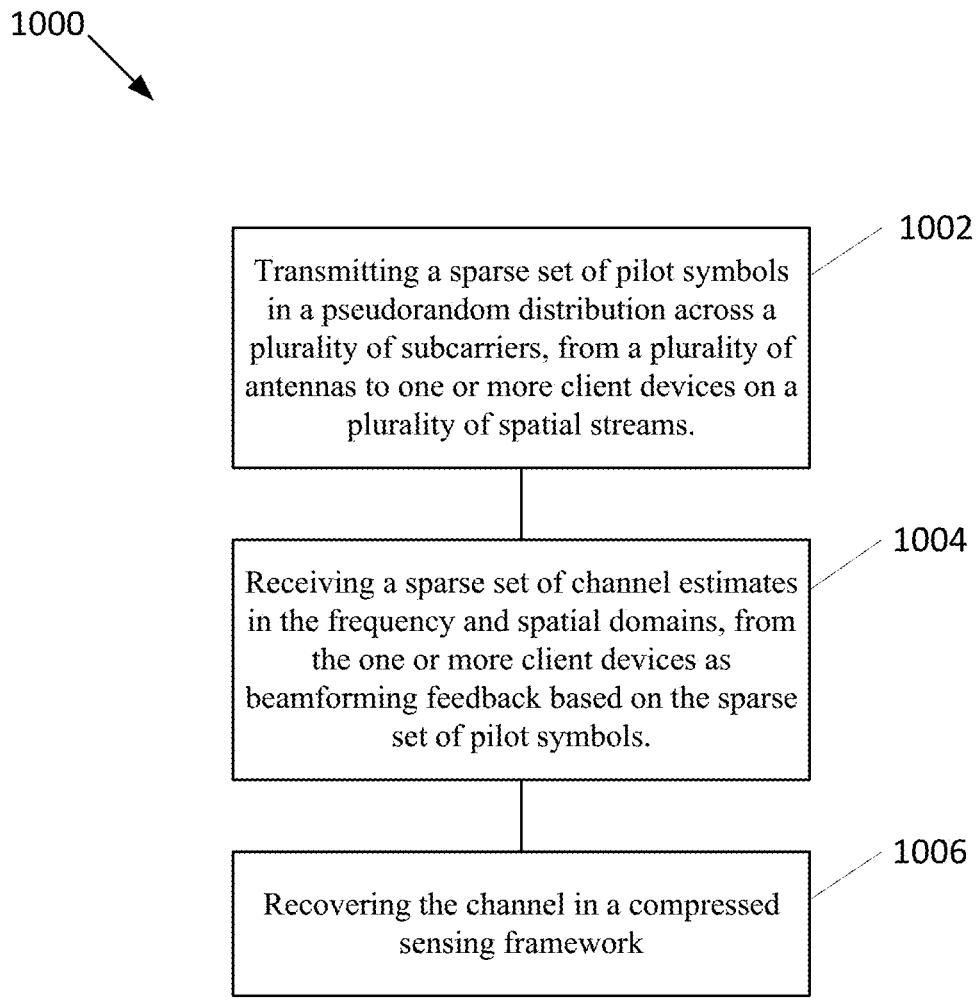
FIG. 10 is a flowchart illustrating an example method according to the present disclosure.

FIG. 10 is a flowchart 1000 illustrating an example method for reducing channel sounding in a MU-MIMO WLAN according to the present disclosure. Method 1000 begins at operation 1002, transmitting a sparse set of pilot symbols in a pseudorandom distribution across a plurality of subcarriers, as described above, from a plurality of antennas to one or more client devices on a plurality of spatial streams. Method 1000 continues at operation 1004, receiving a sparse set of channel estimates in the frequency and spatial domains, from the one or more client devices as beamforming feedback based on the sparse set of pilot symbols, as described above. Method 1000 concludes with operation 1006, recovering the channel in a compressed sensing framework as described in detail above.

Figure 11:
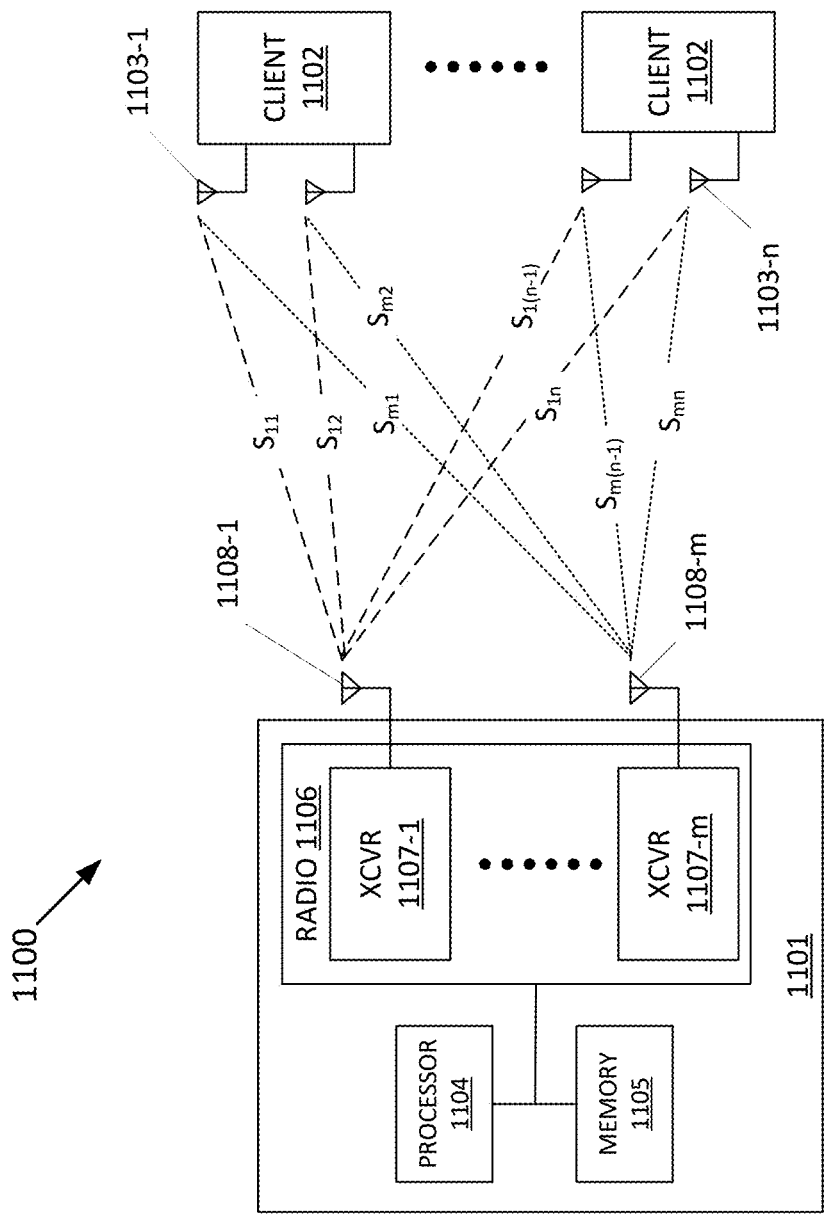
FIG. 11 is a block diagram illustrating an example system according to the present disclosure.

FIG. 11 is a block diagram of an example MU-MIMO WLAN system 1100 including an access point (AP) 1101 and a plurality of client devices (clients) 1102 having a total of n antennas 1103-1 through 1103-n. The AP 1101 includes a processor 1104, a memory 1105 coupled with the processor 1104, and a radio 1106 coupled with the processor 1103, including m transceivers 1107-1 through 1107-m and m associated antennas 1108-1 through 1108-m, such that there are m*n spatial streams $$\sum_{i=1, j=1}^{i=m, j=n} S_{ij}$$

between the m antennas 1108 and the n antennas 1103. Note that for simplicity and ease of explanation, each spatial stream Sij in FIG. 11 represents the combined signal from the ith antenna to the jth due to all LOS and multipaths between those antennas. The memory 1104 contains instruction, executed by the processor 1103 that configure the operation of the AP 1101. In one example, AP 1101 is configured to transmit a sparse set of pilot symbols in a pseudorandom distribution across a plurality of subcarriers, from the m antennas 1107 to the n antennas 1103 on the m*n spatial streams.

In one example, the AP 1101 is configured to receive a sparse set of channel estimates $\underline{H}_{ij}$ in the frequency and spatial domains, from the client devices 1102 as beamforming feedback based on the sparse set of pilot symbols. The AP 1101 is further configured to recover the channel in a compressed sensing framework as described above in detail.

In one example, the sparse set of channel estimates comprise a complex frequency domain matrix for each of the plurality of spatial streams, where the AP 1101 is configured to recover the channel in the compressed sensing framework by extracting a sparse time domain and spatial frequency domain matrix from the sparse set of channel estimates, using a compressed sensing algorithm, constructing a κ-sparse vector by stacking the channel vectors of the sparse time domain and spatial frequency domain matrix, and reconstructing the channel in the frequency and spatial domains from the κ-sparse vector.

In one example, in order to transmit the sparse set of pilot symbols, the AP 1101 is configured to pseudo-randomly distribute 4κ pilot symbols across the plurality of subcarriers for channel sounding.

In one example, the AP 1101 is configured, in a first transmission, to transmit a set of pilot symbols with a duration not less than the duration of the cyclic prefix established for the multipath channel between the AP, and in subsequent transmissions, to transmit the 4κ pseudo-randomly distributed pilot symbols across the plurality of subcarriers and map only one pilot signal to only one antenna of the m antennas during a symbol period.

In one example, the AP is configured to transmit a pilot signal format announcement in advance of the sparse set of pilot symbols, where the pilot signal format announcement is either a table of pseudo-randomly distributed pilot symbol locations, or a seeding number for a pseudo-random number generator in each of the client devices 1102, where the pseudo-random number generator in each client device 1102 replicates a pseudo-random number generator in the AP 1101.

Figure 12:
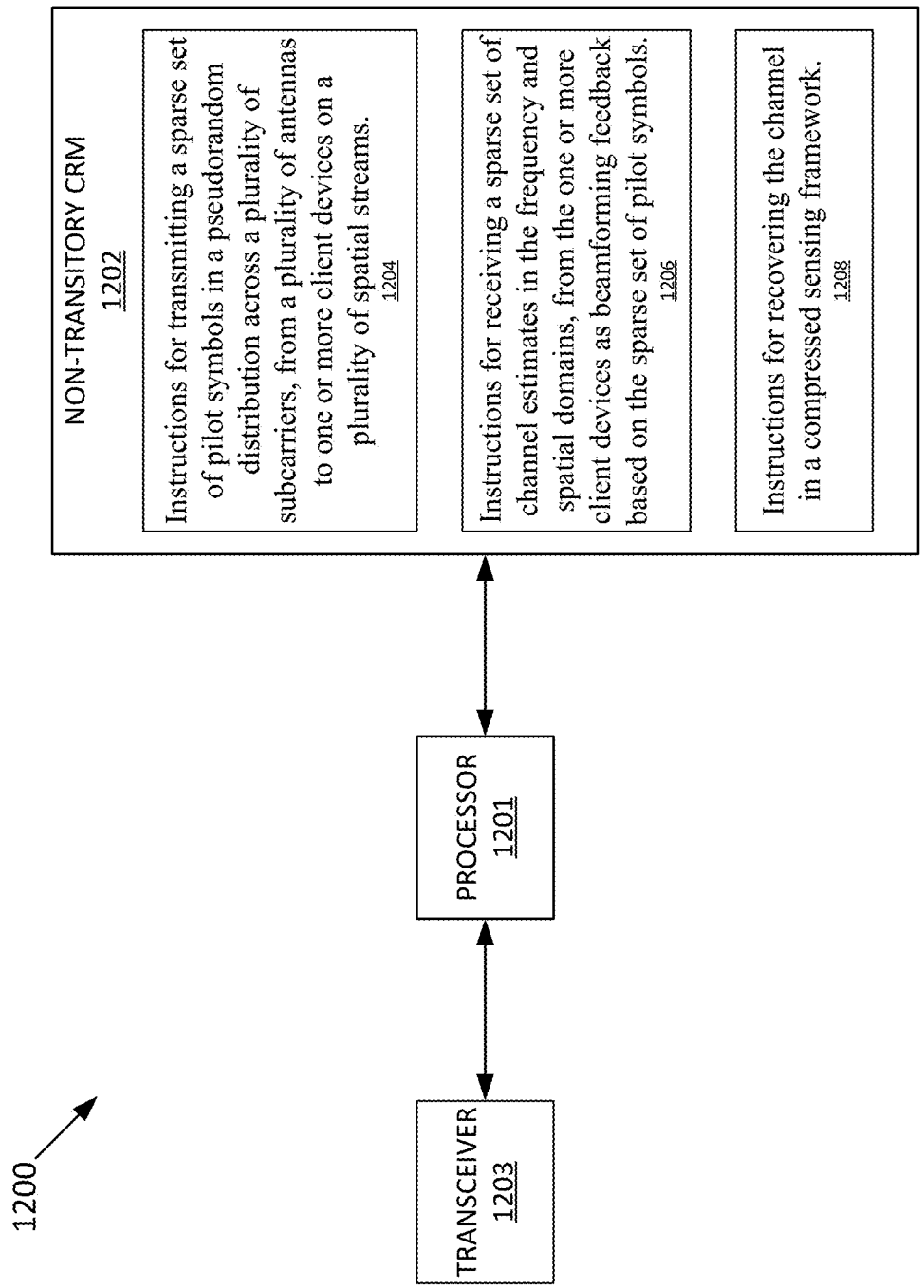
FIG. 12 is a block diagram illustrating an example access point according to the present disclosure.

FIG. 12 is a block diagram of an access point (AP) 1200 according to the present disclosure. AP 1200 includes a processor 1201, a non-transitory computer-readable medium (CRM) 1202 coupled with the processor 1201, and a transceiver 1203 coupled with the processor 1201. The non-transitory CRM 1202 includes instructions that, when executed by the processor 1201, cause the AP 1200 to perform the methods for reduced channel sounding disclosed herein. In particular, the CRM incudes instructions 1204 for transmitting a sparse set of pilot symbols in a pseudorandom distribution across a plurality of subcarriers, from a plurality of antennas to one or more client devices on a plurality of spatial streams, instructions 1206 for receiving a sparse set of channel estimates in the frequency and spatial domains, from the one or more client devices as beamforming feedback based on the sparse set of pilot symbols, and instructions 1208 recovering the channel in a compressed sensing framework.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated examples of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method in an access point (AP) in a multi-user, multiple-input multiple-output (MU-MIMO) wireless LAN, comprising:
   transmitting a sparse set of pilot symbols in a pseudorandom distribution across a plurality of subcarriers, from a plurality of antennas to one or more client devices on a plurality of spatial streams;
   receiving a sparse set of frequency and spatial domain estimates of a channel, from the one or more client devices as beamforming feedback based on the sparse set of pilot symbols, wherein the sparse set of channel estimates comprise a complex frequency domain matrix for each of the plurality of spatial streams; and
   recovering the channel in a compressed sensing framework.

2. The method of claim 1, wherein recovering the channel in the compressed sensing framework comprises:
   extracting a sparse time domain and spatial frequency domain matrix from the sparse set of channel estimates, with a compressed sensing algorithm;
   constructing a κ-sparse vector by stacking channel vectors of the sparse time domain and spatial frequency domain matrix; and
   reconstructing the channel in the frequency and spatial domains from the κ-sparse vector.

3. The method of claim 2, further comprising pseudo-randomly distributing 4κ pilot symbols across the plurality of subcarriers for channel sounding.

4. The method of claim 3, wherein transmitting the sparse set of pilot symbols comprises:
   in a first transmission, transmitting a set of pilot symbols with a duration not less than a duration of a cyclic prefix established for a multipath channel;
   in subsequent transmissions, transmitting the 4κ pseudo-randomly distributed pilot symbols across the plurality of subcarriers; and
   mapping only one pilot symbol to only one antenna of the plurality of antennas during a symbol period.

5. The method of claim 1, further comprising transmitting a pilot symbol format announcement in advance of the sparse set of pilot symbols, wherein the pilot symbol format announcement comprises one of:
   a table of pseudo-randomly distributed pilot symbol locations, or
   a seeding number for a pseudo-random number generator in the one or more client devices, wherein the pseudo-random number generator replicates a pseudo-random number generator in the AP.

6. The method of claim 1, further comprising polling each of the one or more client devices sequentially for channel estimates based on the sparse set of pilot symbols.

7. The method of claim 2, wherein each pilot symbol comprises an Nt subcarrier orthogonal frequency division multiplex (OFDM) symbol, the plurality of antennas comprises m antennas, the one or more client devices comprise n antennas, and a number of spatial paths is Ns=m*n, wherein transforming the sparse set of channel estimates comprises applying an Nt-point inverse fast Fourier transform (IFFT) and an Ns-point IFFT to the sparse set of channel estimates, and wherein transforming the κ-sparse vector comprises multiplying the κ-sparse vector with a Kronecker product of an Nt-point fast Fourier transform (FFT) and an Ns-point FFT.

8. The method of claim 2, wherein constructing the κ-sparse vector comprises one of:
selecting all non-zero elements of the channel vectors;
selecting all non-zero elements of the channel vectors that are greater than or equal to a non-zero threshold; and
selecting all non-zero elements of the channel vectors that are greater than or equal to a non-zero threshold, and a limited number of elements that are below the non-zero threshold.

9. A method in a client device in a multi-user, multiple-input multiple-output (MU-MIMO) wireless LAN, comprising:
receiving at one or more antennas, a sparse set of pilot symbols from an access point (AP) according to a predetermined distribution of pilot symbols across a plurality of subcarriers;
generating and transmitting a sparse set of channel estimates to the AP based on the sparse set of pilot symbols, in response to a polling request from the AP, wherein the sparse set of channel estimates comprise a complex frequency domain matrix for each of a plurality of spatial streams; and
receiving another sparse set of pilot symbols from the AP based on the sparse set of channel estimates after an expiration of a channel coherence period.

10. An access point (AP) in a multi-user, multiple-input multiple-output (MU-MIMO) wireless LAN, comprising:
a processor, a memory coupled with the processor, and a radio coupled with the processor comprising a plurality of transceivers associated with a plurality of antennas, wherein the memory includes instructions that, when executed by the processor, configure the AP to:
transmit a sparse set of pilot symbols in a pseudorandom distribution across a plurality of subcarriers, from the plurality of antennas to one or more client devices on a plurality of spatial streams;
receive a sparse set of frequency and spatial domain estimates of a channel, from the one or more client devices as beamforming feedback based on the sparse set of pilot symbols, wherein the sparse set of channel estimates comprise a complex frequency domain matrix for each of a plurality of spatial streams; and
recover the channel in a compressed sensing framework.

11. The AP of claim 10, wherein to recover the channel in the compressed sensing framework, the processor is further configured to:
extract a sparse time domain and spatial frequency domain matrix from the sparse set of channel estimates, with a compressed sensing algorithm;
construct a κ-sparse vector by stacking channel vectors of the sparse time domain and spatial frequency domain matrix; and
reconstruct the channel in the frequency and spatial domains from the κ-sparse vector.

12. The AP of claim 11, wherein to transmit the sparse set of pilot symbols, the processor is further configured to pseudo-randomly distribute 4κ pilot symbols across the plurality of subcarriers for channel sounding.

13. The AP of claim 12, wherein to transmit the sparse set of pilot symbols, the AP is configured to:
in a first transmission, to transmit a set of pilot symbols with a duration not less than a duration of a cyclic prefix established for a multipath channel; and
in subsequent transmissions, to transmit the 4κ pseudo-randomly distributed pilot symbols across the plurality of subcarriers; and
map only one pilot signal to only one antenna of the plurality of antennas during a symbol period.

14. The AP of claim 10, wherein the AP is configured to transmit a pilot signal format announcement in advance of the sparse set of pilot symbols, wherein the pilot signal format announcement comprises one of:
a table of pseudo-randomly distributed pilot symbol locations, or
a seeding number for a pseudo-random number generator in the one or more client devices, wherein the pseudo-random number generator replicates a pseudo-random number generator in the AP.

15. The AP of claim 11, wherein each pilot symbol comprises an Nt subcarrier orthogonal frequency division multiplex (OFDM) symbol, the plurality of antennas comprises m antennas, the one or more client devices comprise n antennas, and a number of spatial paths is Ns=m*n,
wherein to transform the sparse set of channel estimates, the processor is configured to apply an Nt-point inverse fast Fourier transform (IFFT) and an Ns-point IFFT to the sparse set of channel estimates, and
wherein to transform the κ-sparse vector, the processor is configured to multiply the κ-sparse vector with a Kronecker product of an Nt-point fast Fourier transform (FFT) and an Ns-point FFT.

16. The AP of claim 11 wherein to construct the κ-sparse vector, the processor is configured to select one of:
all non-zero elements of the channel vectors;
all non-zero elements of the channel vectors that are greater than or equal to a non-zero threshold; and
all non-zero elements of the channel vectors that are greater than or equal to a non-zero threshold, and a limited number of elements that are below the non-zero threshold.

17. A non-transitory computer-readable medium (CRM), comprising instructions that, when executed by a processor in a wireless LAN access point (AP), cause the AP to perform operations comprising:
transmitting a sparse set of pilot symbols in a pseudorandom distribution across a plurality of subcarriers, from a plurality of antennas to one or more client devices on a plurality of spatial streams;
receiving a sparse set of frequency and spatial domain estimates of a channel from the one or more client devices as beamforming feedback based on the sparse set of pilot symbols, wherein the sparse set of channel estimates comprise a complex frequency domain matrix for each of a plurality of spatial streams; and
recovering the channel in a compressed sensing framework.

18. The CRM of claim 17, wherein recovering the channel in the compressed sensing framework comprises:
extracting a sparse time domain and spatial frequency domain matrix from the sparse set of channel estimates, with a compressed sensing algorithm;
constructing a κ-sparse vector by stacking channel vectors of the sparse time domain and spatial frequency domain matrix; and reconstructing the channel in the frequency and spatial domains from the κ-sparse vector.

19. The CRM of claim 18, wherein the AP is further configured to pseudo-randomly distribute 4κ pilot symbols across the plurality of subcarriers for channel sounding.

20. The CRM of claim 19, wherein to transmit the sparse set of pilot symbols, the AP is further configured to:
  in a first transmission, transmit a set of pilot symbols with a duration not less than a duration of a cyclic prefix established for a multipath channel;
  in subsequent transmissions, transmit the 4κ pseudo-randomly distributed pilot symbols across the plurality of subcarriers; and
  map only one pilot symbol to only one antenna of the plurality of antennas during each symbol period.

* * * * *